United States Patent
Saeed et al.

(10) Patent No.: US 10,127,538 B2
(45) Date of Patent: Nov. 13, 2018

(54) SMART INTEGRATED POINT OF SALE SYSTEM

(71) Applicant: Innowi Inc., Santa Clara, CA (US)

(72) Inventors: Faisal Saeed, San Jose, CA (US); Zia Hasnain, San Jose, CA (US); Asif Rao, San Jose, CA (US)

(*) Notice: Subject to any disclaimer, the term of this patent is extended or adjusted under 35 U.S.C. 154(b) by 377 days.

(21) Appl. No.: 14/850,943

(22) Filed: Sep. 10, 2015

(65) Prior Publication Data

US 2017/0076269 A1    Mar. 16, 2017

(51) Int. Cl.

| | |
|---|---|
| *G06K 15/00* | (2006.01) |
| *G06Q 20/20* | (2012.01) |
| *G07G 1/00* | (2006.01) |
| *G07G 1/12* | (2006.01) |
| *G06Q 20/40* | (2012.01) |

(52) U.S. Cl.
CPC ......... *G06Q 20/206* (2013.01); *G06Q 20/208* (2013.01); *G06Q 20/40145* (2013.01); *G07G 1/0018* (2013.01); *G07G 1/0045* (2013.01); *G07G 1/0081* (2013.01); *G07G 1/12* (2013.01)

(58) Field of Classification Search
CPC .......... G06K 15/00; G06K 19/00; G06K 7/00; G06F 17/00; G06G 1/12; G06Q 30/00; G06Q 20/00
USPC ....... 235/383, 375, 487, 486; 705/21, 14.65, 705/16
See application file for complete search history.

(56) References Cited

U.S. PATENT DOCUMENTS

| | | | |
|---|---|---|---|
| 6,550,671 B1 * | 4/2003 | Brown | G07D 11/0066 235/379 |
| D491,216 S | 6/2004 | Ookushi et al. | |
| D527,759 S | 9/2006 | Ono | |
| D528,585 S | 9/2006 | Ono | |
| D542,833 S | 5/2007 | Ando et al. | |
| D588,186 S | 3/2009 | Yamakawa | |
| D614,687 S | 4/2010 | Ono | |
| D625,304 S | 10/2010 | Armstrong | |
| D689,126 S | 9/2013 | Eun | |
| D699,240 S | 2/2014 | Kim et al. | |

(Continued)

OTHER PUBLICATIONS

Non-Final Office Action, dated Jun. 6, 2017, U.S. Appl. No. 29/540,888, filed Sep. 29, 2015.

*Primary Examiner* — Edwyn Labaze

(57) ABSTRACT

Embodiments of the present technology relate to an all-in-one integrated transaction platform. An example integrated point of sale (PoS) device comprises a tablet processor, secure processor, and memory for storing executable instructions that comprise a business management system, a housing comprising a plurality of video display screens, wherein a merchant display screen is coupled to at least one customer display screen, a business management system receiving input from the plurality of video display screens, a payment reader, wherein the payment reader is capable of accepting at least magnetic swipe cards, EMV (Europay, MasterCard, and Visa) chip and pin cards, and NFC (near field communication) payment, a barcode scanner, a cash drawer, a printer, an ADA (American Disabilities Act) compliant secure keypad, a biometric verification unit, at least one camera, GPS (Global Positioning System), and wired and wireless communication technologies such as but not limited to Ethernet, Wi-Fi, Bluetooth, 3G/4G etc.

37 Claims, 13 Drawing Sheets

(56) References Cited

U.S. PATENT DOCUMENTS

| | | |
|---|---|---|
| D728,676 S | 5/2015 | Reines et al. |
| D729,232 S | 5/2015 | Wu et al. |
| D741,853 S | 10/2015 | Barron et al. |
| D775,595 S | 1/2017 | Nuk et al. |
| 2006/0181515 A1* | 8/2006 | Fletcher .............. G06F 3/04886 345/173 |
| 2012/0181327 A1* | 7/2012 | Doi .................... G07D 11/0072 235/2 |
| 2012/0316963 A1* | 12/2012 | Moshfeghi ............. G06Q 20/20 705/14.58 |
| 2013/0136259 A1* | 5/2013 | Crook ................ G06K 7/10544 380/243 |
| 2013/0278122 A1* | 10/2013 | Edwards ............... E05B 65/461 312/237 |
| 2016/0005020 A1* | 1/2016 | Fernando ................ G06F 3/048 705/21 |
| 2016/0070964 A1* | 3/2016 | Conrad ................ G07G 1/0018 348/150 |
| 2016/0210100 A1* | 7/2016 | Ng ........................... G06F 3/03 |

\* cited by examiner

SMART INTEGRATED POINT OF SALE SYSTEM

TECHNICAL FIELD

The present technology relates generally to point-of-sale (PoS) systems, and, more particularly, to an all-in-one integrated smart transaction platform, services, and method of use.

BACKGROUND

The point of sale (PoS) industry has been slow to progress, innovate, and implement new technologies. Typical PoS terminal systems utilize aging technology, are bulky, are not capable of doing more than a few tasks, and require multiple peripheral devices if required to take on more tasks.

Therefore, it is advantageous to combine all the features of a legacy multi-piece countertop payment system into one unified look as well as adding new technologies into a single piece of sleek equipment. Not only will a single integrated system free up limited retail counter space and provide a modern look, but it will also allow merchants to, for example, provide customers with personalized, interactive experiences while in a store or give merchants insight into a customer's shopping habits to provide a better buying experience for the customer that may result in, for example, increased revenue. An all-in-one unified, integrated unique form factor for countertop PoS systems is not present in the market today.

It should be apparent from the foregoing that there is a need to provide a fully integrated, modern looking, smart point of sale system.

SUMMARY

Embodiments of the present technology include an integrated point of sale (PoS) device comprising: a tablet processor to execute business management applications, a register applications, third-party written applications; a plurality of video display touch screens, wherein a merchant display screen is coupled to a customer display screen; a secure processor for a payment reader, wherein the payment reader is capable of accepting at least magnetic swipe cards, EMV (Europay, MasterCard, and Visa) chip and pin cards, and NFC (near field communication) payment, an ADA (American Disabilities Act) compliant secure keypad; a signature touch screen; a barcode scanner; a weighing scale; a cash drawer; a printer; an ADA (American Disabilities Act) compliant secure keypad; at least one camera; GPS (Global Positioning System), wireless communication technologies that include but are not limited to, Wi-Fi, Bluetooth, 2G/3G/4G, etc.; and a biometric verification unit.

Other embodiments of the present technology include a portable PoS device, comprising: a tablet processor to execute business management applications, a registers applications, third-party written applications; a plurality of video display touch screens, wherein a merchant display screen is coupled to a customer display screen; a secure processor for a payment reader, wherein the payment reader is capable of accepting at least magnetic swipe cards, EMV chip and pin cards, and NFC payment; an ADA compliant secure keypad; signature touch screen; a barcode scanner; at least one camera; GPS; wireless communication technologies that include but are not limited to, Wi-Fi, Bluetooth, 2G/3G/4G, etc.; and a biometric verification unit.

Other embodiments of the present technology include a handheld point of sale (PoS) device, comprising: a tablet processor to execute business management applications, a registers applications, third-party written applications; at least one video display touch screen comprising at least one of a merchant display screens and at least one of a customer display screens; a secure processor for a payment reader, wherein the payment reader is capable of accepting at least magnetic swipe cards, EMV chip and pin cards, and NFC payment; an ADA compliant secure keypad; signature touch screen; a barcode scanner; at least one camera; GPS; wireless communication technologies that include but are not limited to, Wi-Fi, Bluetooth, 2G/3G/4G, etc.; and a biometric verification unit.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Current PoS systems on the market are bulky, take up large amounts of valuable countertop space, utilize outdated technology, consist of multiple separate attachments, and do not offer a modern look and feel. Moreover, current systems that have some modern look are not capable of accepting all forms of payments, and they are not able to provide valuable user experiences for customers, shop owners, and businesses. Therefore, there is a need to provide a complete end-to-end business management solution that comprises different hardware and software components to provide an integrated payment and customer experience solution.

Embodiments of the present disclosure are directed to an all-in-one integrated smart payment platform, merchant services and method of use.

Generally, a smart device is an electronic device that can be connected to other devices or networks using various protocols such as Bluetooth, NFC, Wi-Fi, 2G/3G/4G, etc.

In some embodiments, the all-in-one smart integrated point of sale system includes a PoS countertop device that provides an interface to a merchant services backend, a backend system that serves a request by applying pre-defined business logic, a database system to store, retrieve, update, delete transaction information, a data warehouse to manage historic data derived from transaction information and other data management sources, payment backend, and a management console to provide visibility to management to monitor all activities, generate reports, and allow management to manually interact with the all-in-one smart integrated point-of-sale system to update and modify information based on business intelligence and data mining.

These and other advantages of the present technology are described herein with reference to the collective drawings.

Figure 1:
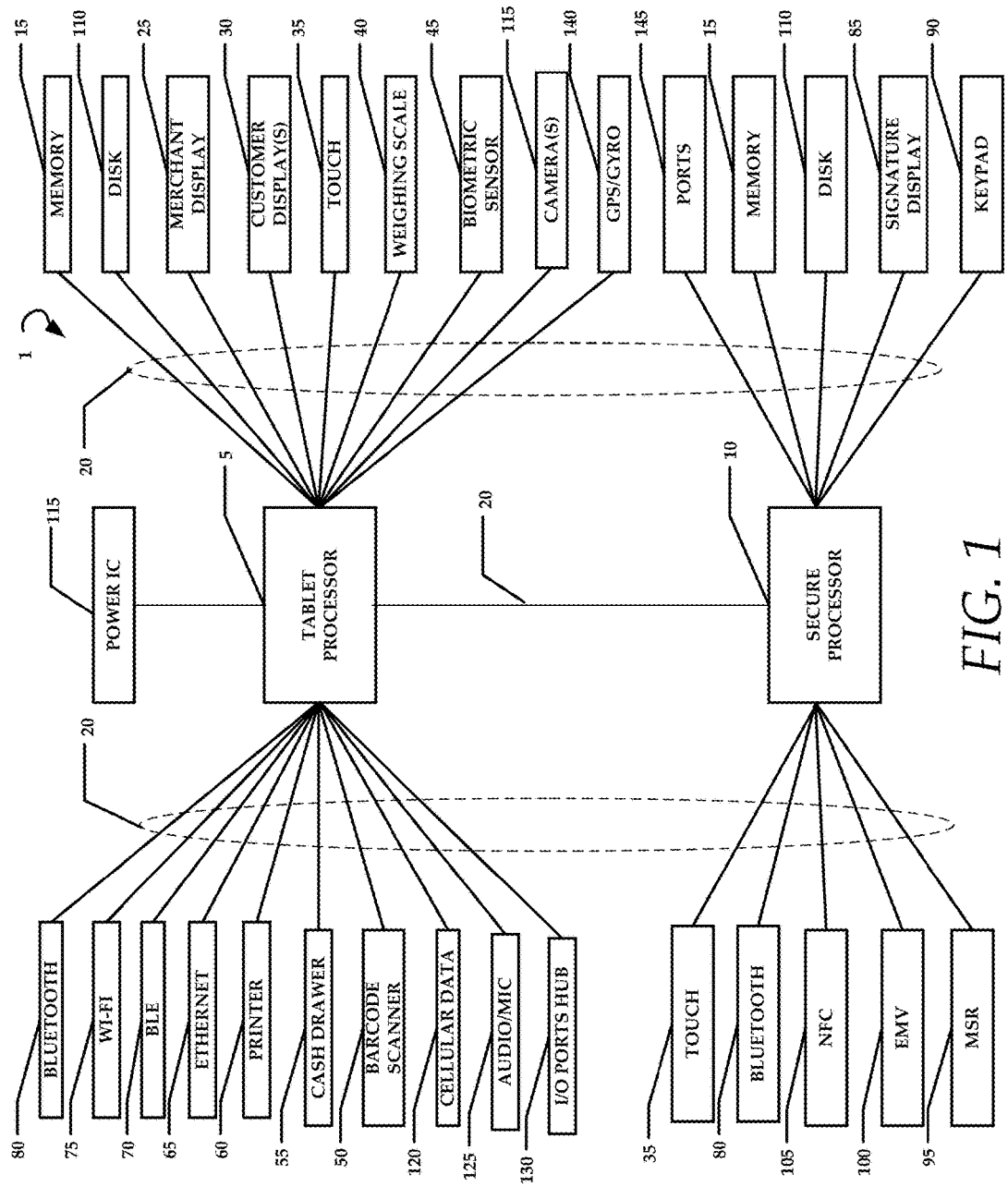
FIG. 1 is a schematic representation of a point of sale device.

FIG. 1 is a diagrammatic representation of an example machine, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PoS device, a personal computer (PC), a tablet PC, a personal digital assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine in the form of a PoS device 1 in FIG. 1 includes a tablet processor 5 (e.g., Intel® Atom® processor or any other tablet processor), a secure payment processor 10, and a main memory and static memory (collectively "memory 15"), which communicate with each other and any additional components via a bus 20. The PoS device 1 may further include display(s), such as merchant display 25, at least one customer display 30. The PoS device 1 may also include an alpha-numeric or numeric input device(s) (e.g., a keyboard, keypad, touchscreen 35, numeric keypad), a weighing scale 40, biometric sensor(s) 45 (e.g., fingerprint, voice recognition, face recognition, etc.), a scanner or barcode reader 50, a cash drawer 55, at least one camera 115, and a printer 60. The PoS device 1 can be connected to other devices or networks via Ethernet 65, Bluetooth Low Energy (BLE) 70, Wi-Fi 75, Cellular data 120, such as 2G/3G/4G, and Bluetooth 80. Additionally, PoS device 1 may include a signature display 85, a keypad 90, a magnetic stripe reader (MSR) 95, an EMV (Europay, MasterCard, and Visa) card reader 100, NFC (Near field communication) reader 105, a drive unit 110 (also referred to as disk drive unit), audio/microphone 125, GPS/gyroscope 140, I/O (Input/Output) Ports Hub, and ports 145. The PoS device 1 may further include a power integrated circuit (IC) 115 that can manage the power supply to various components within PoS device 1 and a data encryption module (not shown) to encrypt data.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, cellular data technologies like LTE, 2G/3G/4G, etc., or an IEEE 802.11-based radio frequency network.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, Customer Relationship Management (CRM) systems, Enterprise Resource Planning (ERP) systems, and the like, which may be utilized in order to implement any of the embodiments of the disclosure as described herein.

The present technology may be implemented as a web service in a secure cloud-based distributed scalable computing environment. A cloud-based computing environment is a resource that typically combines the computational power of a large grouping of processors and/or that combines the storage capacity of a large grouping of computer memories or storage devices sometimes distributed in different continents. For example, systems that provide a cloud resource may be utilized exclusively by their owners; or such systems may be accessible to outside users who deploy applications within the computing infrastructure to obtain the benefit of large computational or storage resources and may provide outside users access to larger audience.

The cloud back-end to support a PoS device may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

The present technology is described above with reference to exemplary embodiments. Therefore, other variations upon the exemplary embodiments are intended to be covered by the present technology.

Figure 2:
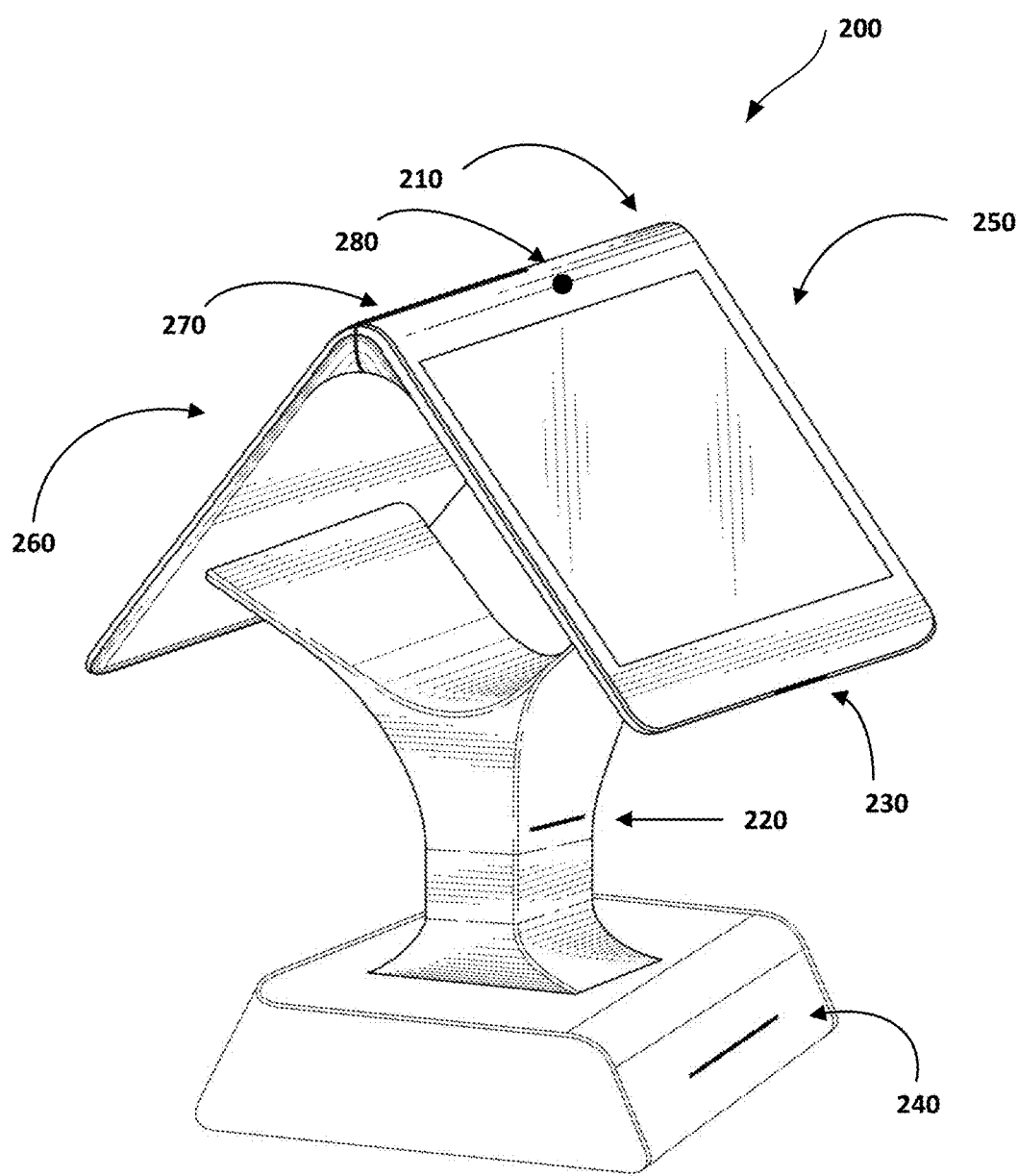
FIG. 2 is an exemplary embodiment of an integrated smart point of sale system according to aspects of the present technology.

FIG. 2 illustrates an exemplary embodiment of a PoS countertop device 200. PoS countertop device 200 may include components such as a smart tablet display 210, a printer 220, a scanner 230, and a smart cash drawer 240. In some embodiments, smart tablet display 210 includes a plurality of display screens such as merchant screen 250, at least one customer screen 260, an electronic signature screen illustrated in FIG. 5. These displays may also be touch screens. In particular embodiments, PoS countertop device 200 further includes card reader 270 (e.g., magnetic stripe reader, EMV chip reader), NFC for paying by tapping a personal mobile device on PoS system (not shown), biometric verification unit (not shown), secure keypad (not shown), and weighing scale (not shown). The present technology may utilize attachments, combinations of attachments, or combinations of attachments and capabilities resident within PoS countertop device 200 and/or other hardware devices. In some embodiments, POS countertop also includes 2G/3G/LTE, Wi-Fi and Bluetooth for wireless connectivity.

PoS countertop device 200 offers secure payment interface in various embodiments and may accept all current and future payment types by integrating magnetic stripe reader, EMV chip reader, and near field communication (NFC) into a single countertop solution without attaching additional external components for payment. Through the magnetic stripe reader, PoS countertop device 200 can accept traditional card swipe forms of payment. The EMV chip reader utilizes specialized hardware to accept new and more secure EMV chip and pin payment that requires a special chip on the card for added security by combining chip data with signature. NFC enables PoS countertop device 200 to accept additional advanced forms of payment, such as Apple Pay™, Android Pay, Google Wallet™, etc.

Figure 9:
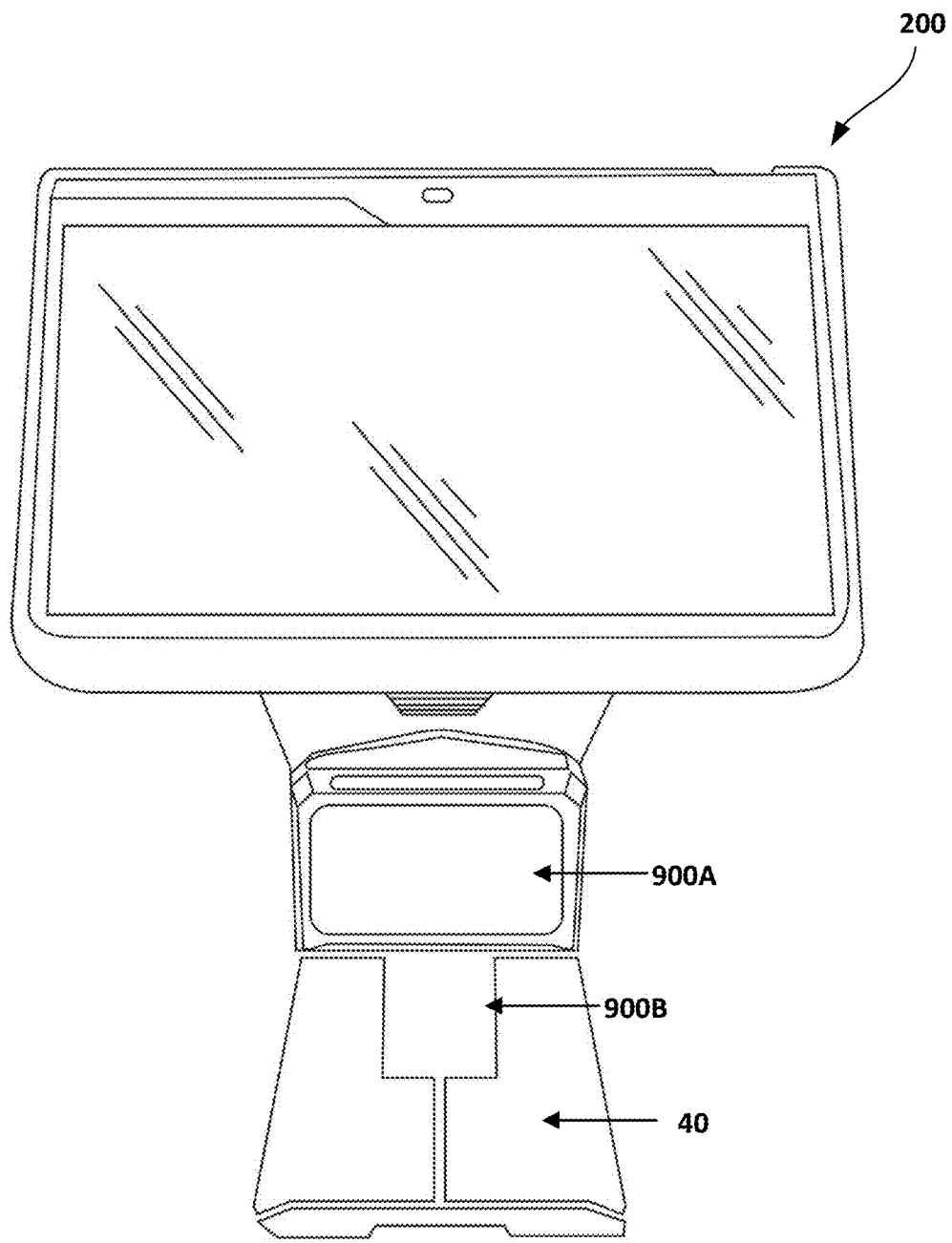
FIG. 9 is an exemplary embodiment of an integrated smart point of sale system including a bi-optic scanner.

In some embodiments, PoS countertop device 200 includes a bi-optic scanner 900A and 900B, as illustrated in the exemplary embodiment of FIG. 9, integrated into the base of PoS countertop device 200. Multi-plane bi-optic scanner 900A and 900B can capture virtually any printed or mobile 1-D or 2-D barcode in any condition or orientation such as grocery item barcodes, loyalty cards, ID cards, driver's licenses, coupons, or barcodes on mobile devices among other things. In various embodiments, the multitude of omnidirectional laser lines of bi-optic scanner 900A and 900B allows for high volume and high pass-through checkout. Furthermore, weigh scale 40 may be integrated into the base of PoS countertop device 200 in addition to bi-optic scanner 900A and 900B.

Figure 10A:
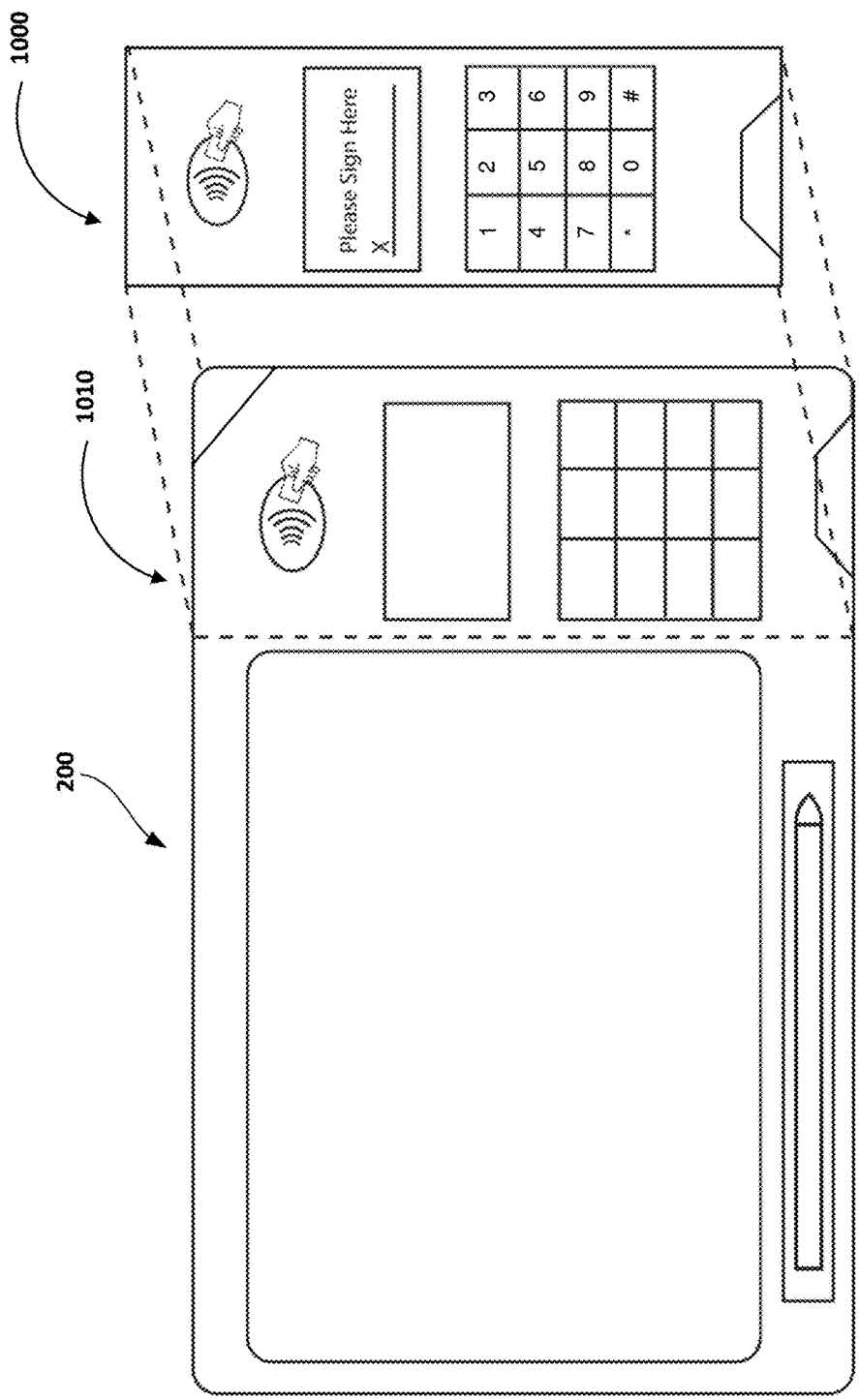
FIGS. 10A, 10B, and 10C are several exemplary embodiments of separate payment modules according to aspects of the present technology.

In particular embodiments, PoS countertop device 200 and portable PoS device 400 later discussed in FIG. 5 include a separate payment module 1000 (also referred to as payment processor board 1000 herein), as illustrated in the exemplary embodiment of FIG. 10A, that can be detached and attached from PoS countertop device 200. Separate payment module 1000 helps in PCI (Payment Card Industry) Security Standard certification where the whole device will not need to be sent for certification, which will save time and complexity. Devices currently in the market either require the complete device to be sent for certification or existing tablets or older bulkier PoS hardware have to be attached to additional off-the-shelf payment devices. PoS countertop device 200 has a placeholder 1010 for payment processor board 1000 with display, NFC, EMV, MSR and secure keypad. In some embodiments, the payment processor board 1000 can be used separately as a standalone device and can be sent for a quick certification process without sending the entire PoS countertop device 200. Once certified, payment processor board 1000 can be attached, for example, by sliding payment processor board 1000 in to PoS countertop device 200 at placeholder 1010. In some embodiments, payment processor board 1000 communicates with the rest of PoS countertop device 200 via USB.

Figure 10B:
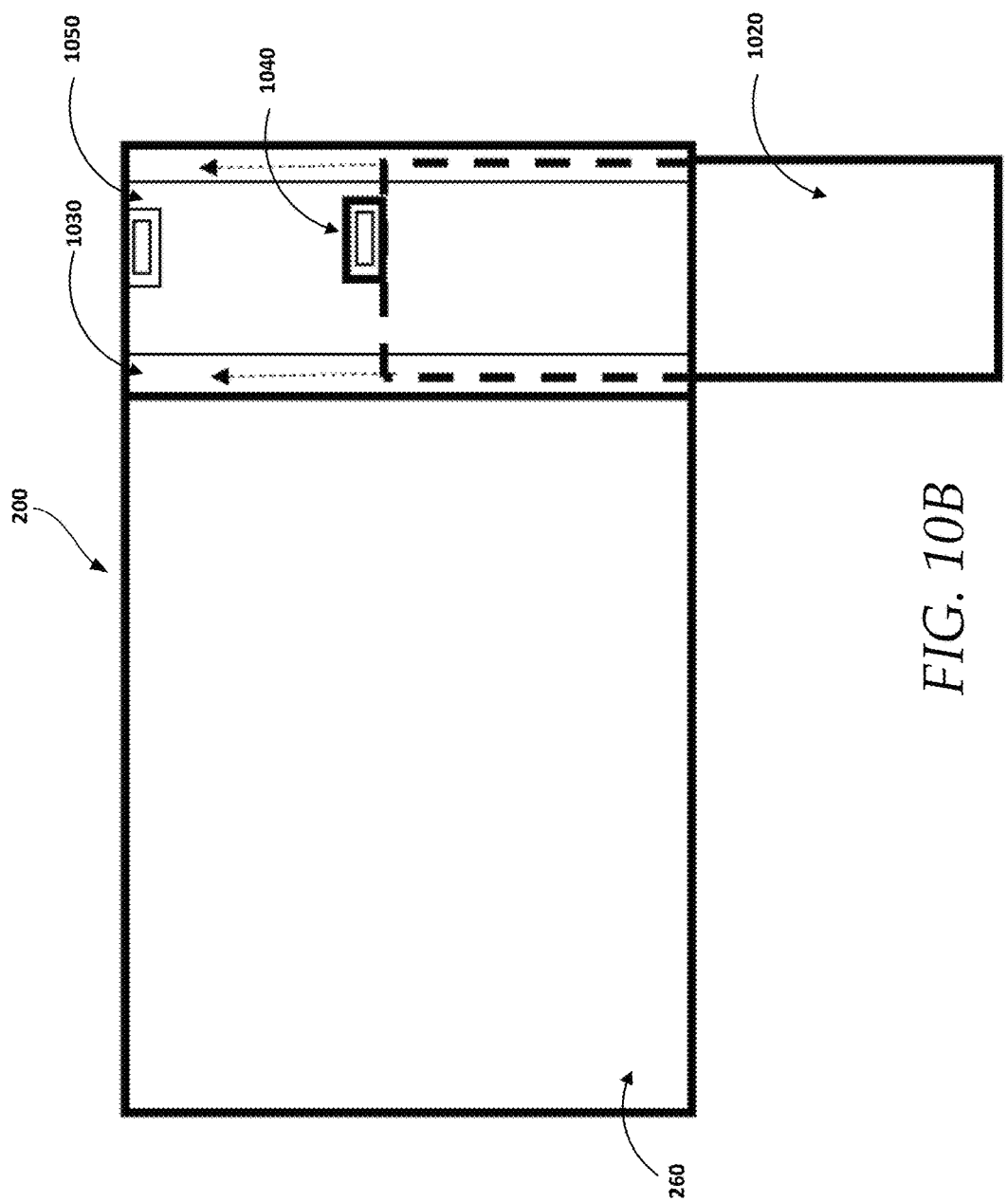

In another exemplary embodiment illustrated in FIG. 10B, payment processor board 1020 is a separate unit that can be attached, for example, by sliding in or snapping into place payment processor board 1020 to the back of the customer screen 260 of PoS countertop device 200. In particular embodiments, payment processor board 1020 is connected to a housing or placeholder 1030 for payment processor board 1020 by connecting the USB male connector 1040 on payment processor board 1020 with the USB female connection 1050 on PoS countertop device 200. In some embodiments, the features on the front of payment processor board 1020, such as a secure keypad and electronic signature screen will be visible from an open window on the front of customer screen 260 once payment processor board 1020 is snapped in to give an appearance of a single unit.

Figure 10C:
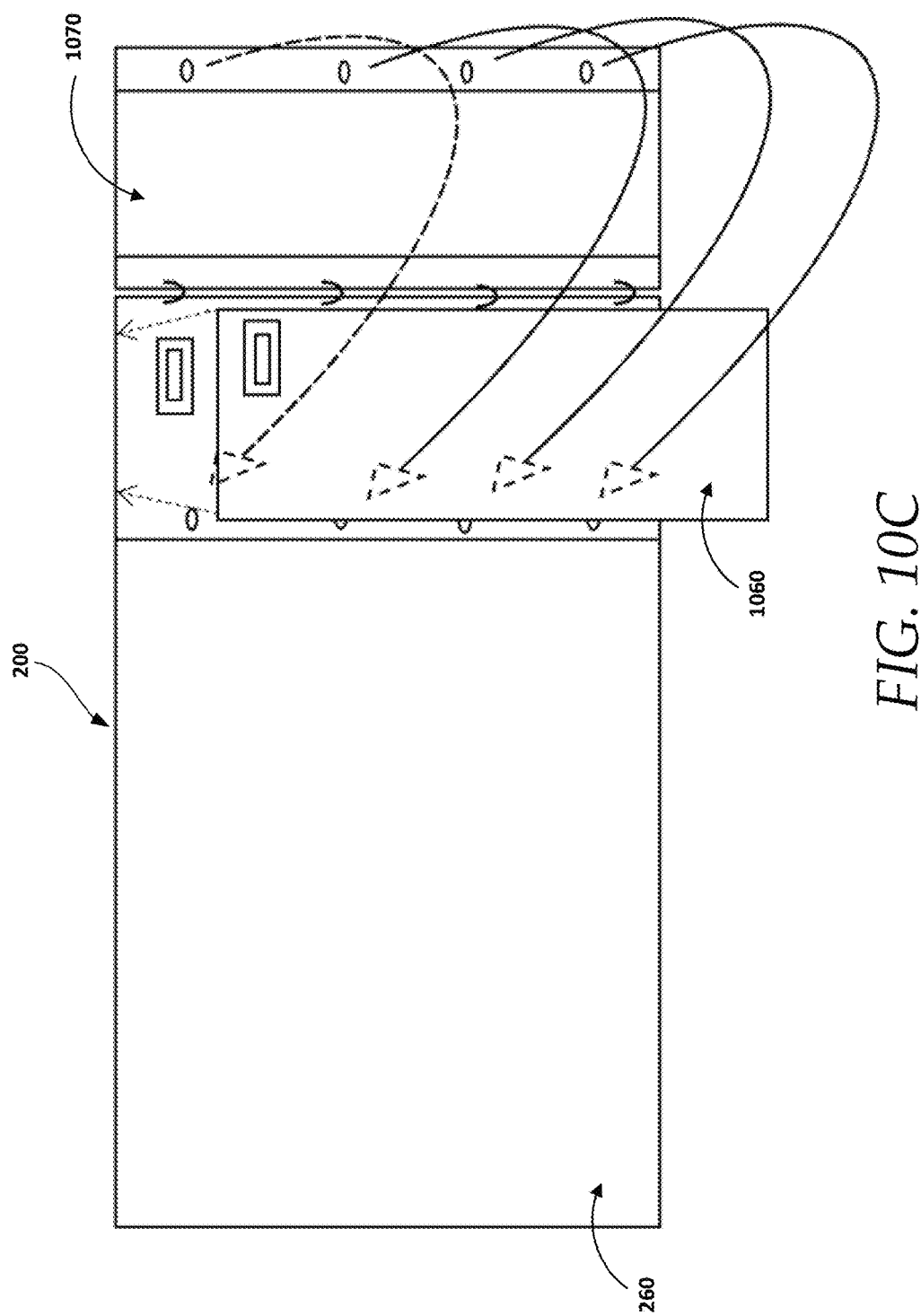

Another further exemplary embodiment is illustrated in FIG. 10C where payment processor board 1060 is placed into the back of customer screen 260 into a housing or pocket, facing the front of customer screen 260, and connected to PoS device 200 through USB. Then back cover 1070 is closed via a hinging mechanism and secured, for example, by screws to prevent payment processor board 1060 from moving and for payment processor board 1060 to appear as part of a single integrated unit.

In particular embodiments, PoS countertop device 200 includes an application processor (not shown) to provide additional capabilities of all non-transactional services. The application processor may run on any machine capable of executing a set of instructions (sequential or otherwise) that specify actions to be taken by that machine such as a smart tablet, laptop, computer, or like device. Moreover, in some embodiments, the application processor runs traditional operating systems such as WINDOWS, ANDROID, LINUX, and the like. In various embodiments, third party application developers can develop applications for the retail industry to be run on PoS countertop device 200. Store owners and businesses can also deploy custom applications on PoS countertop device 200 to collect information that can be mined to help them make better business decision to help customers make better buying decisions through recommendations and personalization.

Current PoS devices only include a single primary display for a merchant that can also be switched to a customer display for the customer's signature which may be inconvenience for both merchants and customers. Returning to FIG. 2, in particular embodiments, a merchant can execute transactions on merchant screen 250 while the customer can view transaction activities with applied discounts along with advertisements on the at least one customer screen 260. Moreover, customer screen 260 provides a secure display for customer signature. In some embodiments, customer screen 260 acts as a dedicated display to run fixed or targeted advertisements. In various embodiments, customer display 260 can make shopping suggestions based on a customer's historic buying trend. According to particular embodiments, merchant screen 250 of PoS countertop device 200 is from 10 inches and up diagonally while customer screen 260 is from 7 inches or more diagonally up to the size of merchant screen 250.

In some embodiments, PoS countertop device 200 includes a biometric verification unit to authenticate employees as well as to identify registered customers. By authenticating employees, access to PoS countertop device 200 will be more secure and faster for employees. Biometric identification of registered customers will allow the customer to securely make payments, apply loyalty program accounts, accumulate reward points, receive recommendations based on the customer's shopping or browsing history, receive personal greetings, redeem coupons, and many more personalized features. In various embodiments, the biometric verification unit can recognize human body characteristics not limited to fingerprints, retina, face recognition, gestures, voice, etc.

For example, PoS countertop device 200 may include a merchant-facing camera 280 and a customer-facing camera to authenticate employees as well as to identify customers using face recognition. By authenticating employees, access to PoS countertop device 200 will secure, and employees can access PoS countertop device 200 faster through face recognition authentication. Furthermore, a merchant-facing camera 280 can be used to video communicate with management or technical support in real time. Face recognition identification of registered customers will allow the customer to apply loyalty program accounts, accumulate reward points, receive recommendations based on the customer's shopping or browsing history, receive personal greetings, redeem coupons, and many more personalized features.

Figure 3:
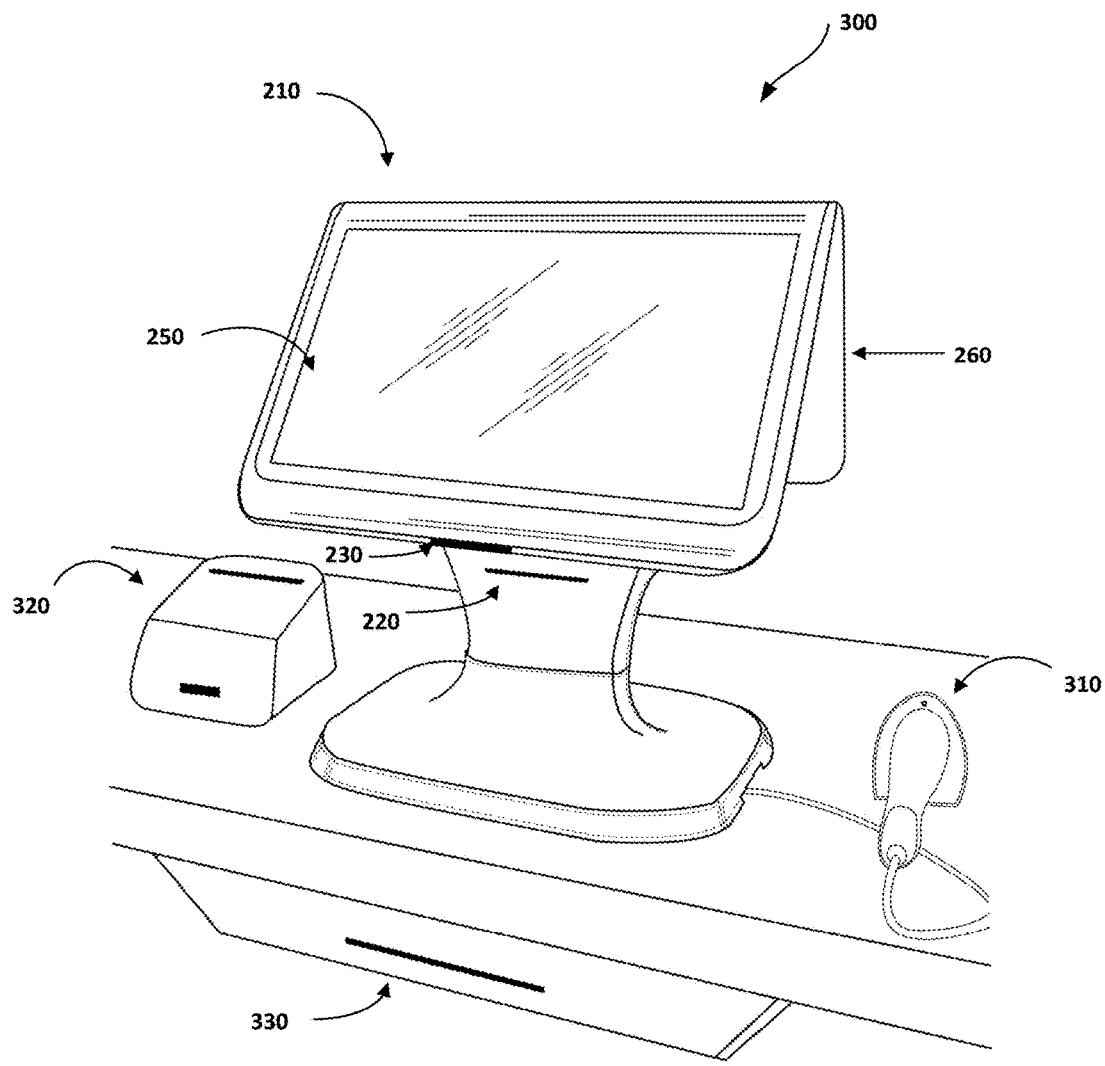
FIG. 3 is another exemplary embodiment of an integrated smart point of sale system according to aspects of the present technology.

In particular embodiments, PoS countertop device 200 includes one or more barcode scanner 230. Barcode scanner 230 may be integrated into merchant screen 250 or both merchant screen 250 and customer screen 260, or barcode scanner 230 may be detachable and affixed to merchant screen 250 using an attachment mechanism such as a magnet. When barcode scanner 230 is detached, the merchant or customer can use barcode scanner 230 to scan distant or heavy items. Additionally, in some embodiments, PoS countertop device 200 includes an external barcode scanner 310 as illustrated in FIG. 3 for users who may want to use commercially available scanners or in case barcode scanner 230 malfunctions. Detachable barcode scanner 230 scans an item and displays the item image from the store database on customer screen 260. For example, if a customer scans the barcode of a food item, the information stored in the barcode is sent to a backend server to find the stored information of the scanned barcode in a database by applying data mining and business intelligence algorithms. Then all the processed data related to the food item is sent to PoS countertop device 200 that displays the processed data on customer screen 260, such as the nutrition facts about the food item and also additional items recommended based on the registered customer's preferences. Additionally, customers have the opportunity to take advantage of deals by combining additional items to their current items, increase the number of their items to achieve additional savings, take advantage of up sale and cross sale by selecting from suggested items that complement the scanned item. In various embodiments, all this is possible by applying sophisticated algorithms that process large amounts of collected raw data in quick time by using in-memory, distributed, NOSQL, and big data technologies.

In some embodiments, the merchant can interact with register applications in order to record the sale of an item based on the scanning of an item barcode or manually searching for an item. For example, through register applications, a merchant can see items or categories from which the merchant can make a selection of a specific item, and the price of the item can automatically be found rather than requiring the merchant to manually input the item cost.

Additionally illustrated in the exemplary embodiment of FIG. 2 is smart cash drawer 240. Cash drawers in traditional PoS systems do not have any smart capabilities. In some embodiments, smart cash drawer 240 can count the amount of cash in the drawer using an automated money counting engine embedded in smart cash drawer 240. Furthermore, smart cash drawer 240 can compare the amount of cash deposited into smart cash drawer 240 with transactions to identify any discrepancies. Additionally, to reduce fraud, smart cash drawer 240 can detect whether any of the deposited bills are counterfeit by embedding sensors available for external devices such as ultraviolet, infrared, microprint, and magnetic sensors. In some embodiments, smart cash drawer 240 is equipped with a smart theft prevention mechanism such as where an unauthorized access of smart cash drawer 240 can trigger an alarm and send an alert to security monitoring personnel either quietly or with an audible alarm.

Printers for conventional PoS systems are usually available as a separate peripheral device. In some embodiments, printer 220 is integrated into countertop PoS device 200. In various embodiments, printer 220 also acts as base to support smart tablet display 210. In another exemplary embodiment illustrated in FIG. 3, there is an additional option of incorporating external printer 320. In some embodiments, external printer 320 includes a printer roll status indicator where the printer roll status indicator may display a remaining percentage on a small display on printer 320 or the printer roll status may be indicated by color LEDs. Additionally, an alert or status can be communicated to responsible personnel via text message, on-screen pop-up window, or e-mail. In some embodiments, the alerts or statuses are recorded in a database for reports and analytics.

In various embodiments, countertop PoS device includes a weighing scale 40. Weighing scale 40 may comprise a thin sensor pad that transmits weight information to countertop PoS device 200, for example, as depicted in FIG. 9.

In particular embodiments, printer 220, external printer 320, detachable barcode scanner 310, weighing scale 40, smart cash draw 240, detachable smart cash drawer 330, and other integrated attachments to smart tablet display 210 may be connected by any wired or wireless connection that would be known to one of ordinary skill in the art with the present disclosure before them. Examples of wired connection would include firewire, USB, and Ethernet—just to name a few. Examples of wireless connections include, but are not limited to Bluetooth, Infrared, and Near Field Communications.

FIG. 3 illustrates another exemplary embodiment of the present technology. PoS countertop device 300 includes smart tablet display 210, comprising merchant screen 250 and customer screen 260, printer 220, optional external printer 320, scanner 230, detachable barcode scanner 310, detachable smart cash drawer 330, and a biometric verification unit. In various embodiments PoS countertop device 300 includes an electronic signature pad or electronic signature screen as illustrated in FIG. 5.

Figure 4:
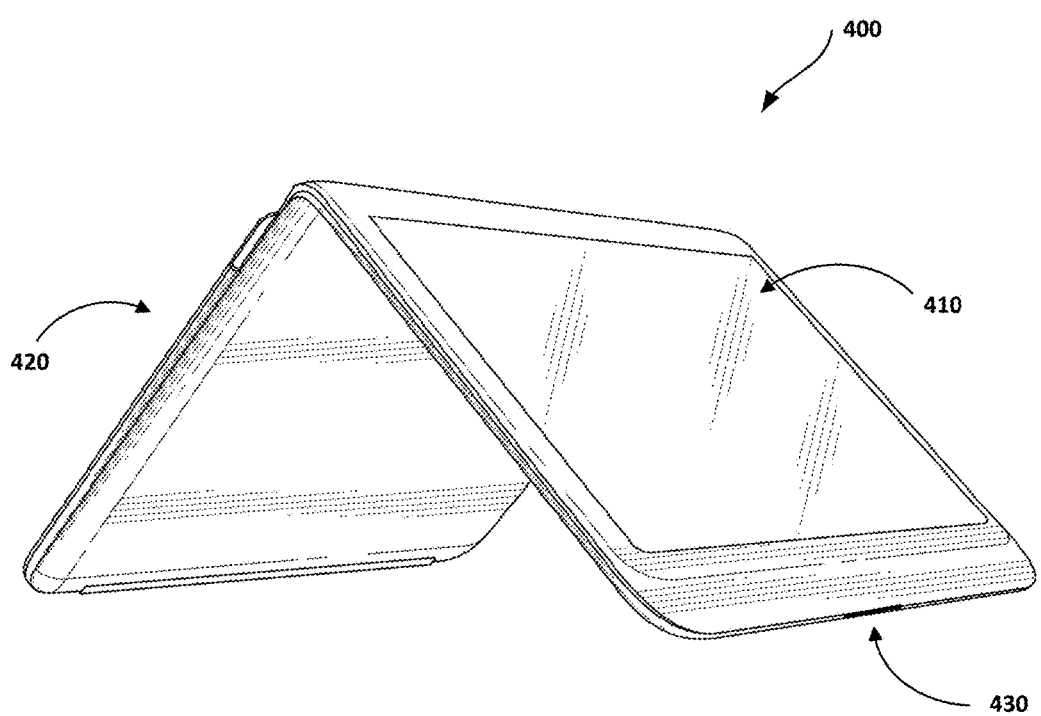
FIG. 4 is a perspective left side view of an exemplary embodiment of a portable integrated smart point of sale system according to aspects of the present technology.
Figure 5:
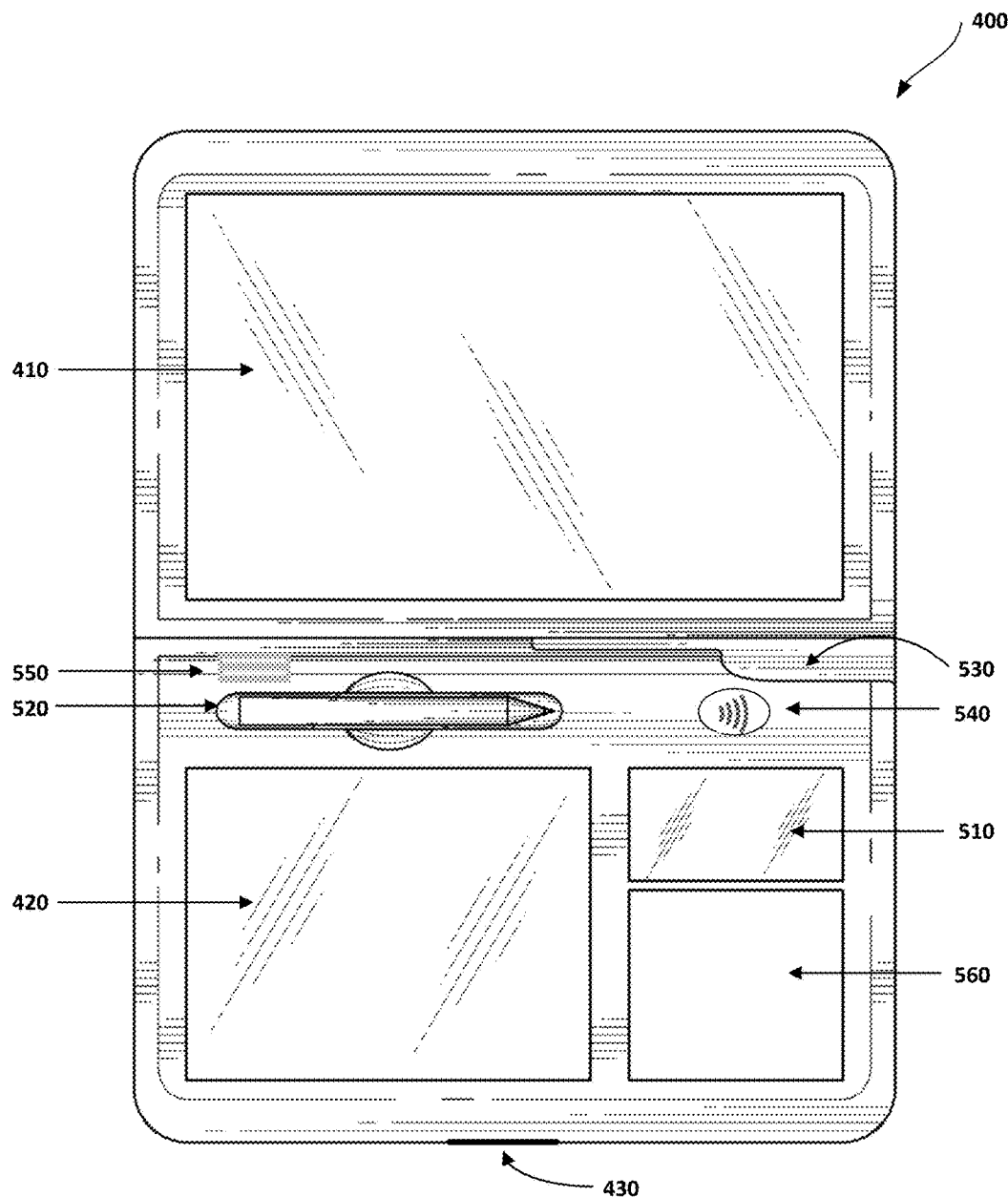
FIG. 5 is a top view of an exemplary embodiment of a portable integrated smart point of sale system according to aspects of the present technology.

FIGS. 4 and 5 illustrate another exemplary embodiment of the present technology where smart display tablet 210 can be used as a portable PoS device 400. In some embodiments, smart tablet display 210 includes a plurality of display screens, such as merchant screen 410, at least one customer screen 420, and electronic signature pad or electronic signature screen 510. The exemplary embodiment illustrated in FIG. 4 includes a flexible hinge coupling the tablet side containing merchant screen 410 with the tablet side containing customer screen 420 so as to allow portable PoS device 400 to be arranged in multiple standing positions for viewing at multiple angles. According to some embodiments, merchant screen 410 of portable PoS device 400 is 10 inches diagonally while customer screen 420 is 7 inches diagonally.

FIG. 5 illustrates an exemplary top view of portable PoS device 400, comprising a plurality of display screen such as merchant screen 410 and at least one customer screen 420. In addition to at least one customer screen 420, in some embodiments, the customer-facing side of portable PoS device 400 also includes scanner 430, electronic signature pad or electronic signature screen 510, stylus 520 with accompanying holder, card reader 530, NFC 540, biometric verification unit 550, and keypad 560. In some embodiments, stylus 520 includes a tracking sensor that beeps or makes an audible or visual alert if stylus 520 is away from portable PoS device 400. For example, if stylus 520 is connected to portable PoS device 400 via Bluetooth, a user may be alerted when stylus 520 is outside the range of the Bluetooth connectivity range which is approximately 10 meters in some instances. In another example, the tracking sensor may be a proximity sensor with a different connectivity range before alerting the user.

Additionally, portable PoS device 400 may include a plurality of customer screens 420 where payment unit is located in the middle of the customer side. In particular embodiments, keypad 540 is an ADA (American with Disabilities Act) compliant secure keypad that is able to accept PINs. As described above, card reader 530 can accept at least traditional magnetic stripe cards as well as EMV chip and pin cards. Through NFC 540, portable PoS device 400 can accept NFC payments such as Apple Pay™, Android Pay Google Wallet™, etc. In some embodiments, a communication can be enabled through multiple wireless technologies that include but are not limited to Wi-Fi, Bluetooth, cellular data such as 2G/3G/4G, etc.

Figure 11A:
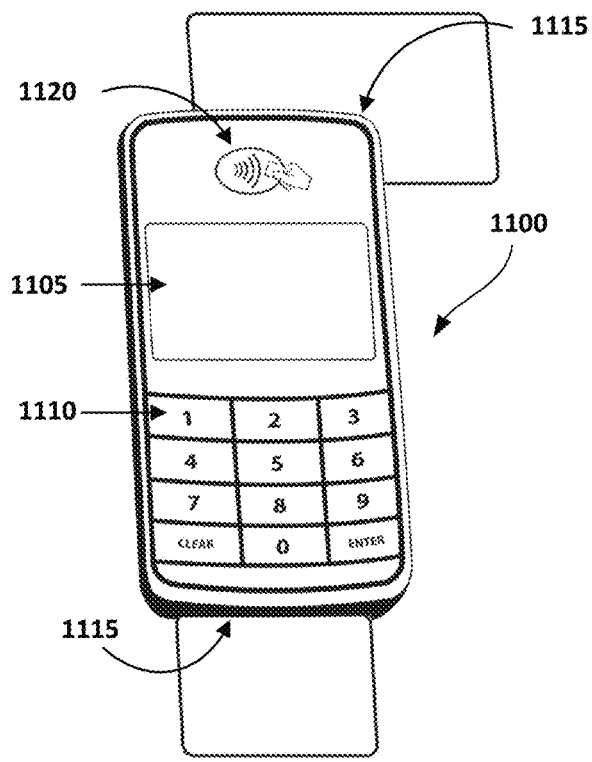
FIGS. 11A and 11B are various views of an exemplary embodiment of a handheld integrated smart point of sale system according to aspects of the present technology.

FIGS. 11A and B illustrate another exemplary embodiment of the present technology where smart display tablet 210 can be used as a handheld PoS device 1100. In some embodiments, handheld PoS device 1100 includes a touch display screen. In another embodiment, handheld PoS device 1100 includes a plurality display and touch screens such as merchant screen 1105 and customer screens (not shown). In some embodiments, a touch customer screen is secure such that the customer can input his or her PIN and sign his or her signature. The exemplary embodiment illustrated in FIG. 11 includes a merchant screen 1105, a secure keypad 1110, and where a tablet processor and secure processor may be on a single side in a compact form factor so as to allow handheld PoS device 1100 to be carried in a hand or a pocket. According to some embodiments, merchant screen 1105 of handheld PoS device 1100 is 3 inches to 7 inches diagonally, and the customer screen is 3 inches to 5 inches diagonally.

Figure 11B:
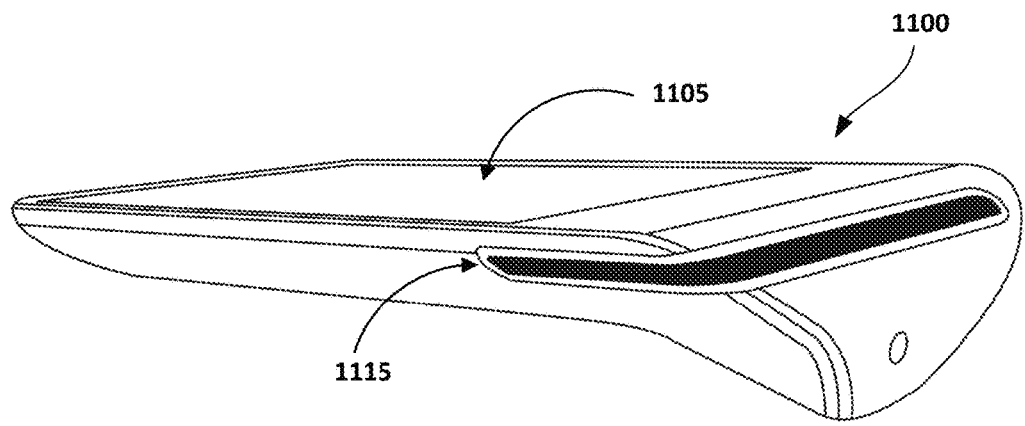

FIG. 11A illustrates an exemplary front view of handheld PoS device 1100, comprising a merchant screen 1105, card reader(s) 1115, NFC 1120, biometric verification unit, and keypad 1110. In particular embodiments, keypad 1110 is an ADA-compliant secure keypad that is able to accept PINs. As described above, card reader(s) 1115 can accept at least traditional magnetic stripe cards as well as EMV chip and pin cards. Through NFC 1120, handheld PoS device 1100 can accept NFC payments such as Apple Pay™, Android Pay, Google Wallet™, etc. In addition to merchant screen 1105, in some embodiments, the backside of handheld PoS device 1100 also includes detachable scanner and a detachable printer. In some embodiments, a communication can be enabled through multiple wireless technologies that include but are not limited to Wi-Fi, Bluetooth, cellular data such as 2G/3G/4G, etc. FIG. 11B illustrates an exemplary side view of handheld PoS device 1100.

Figure 6:
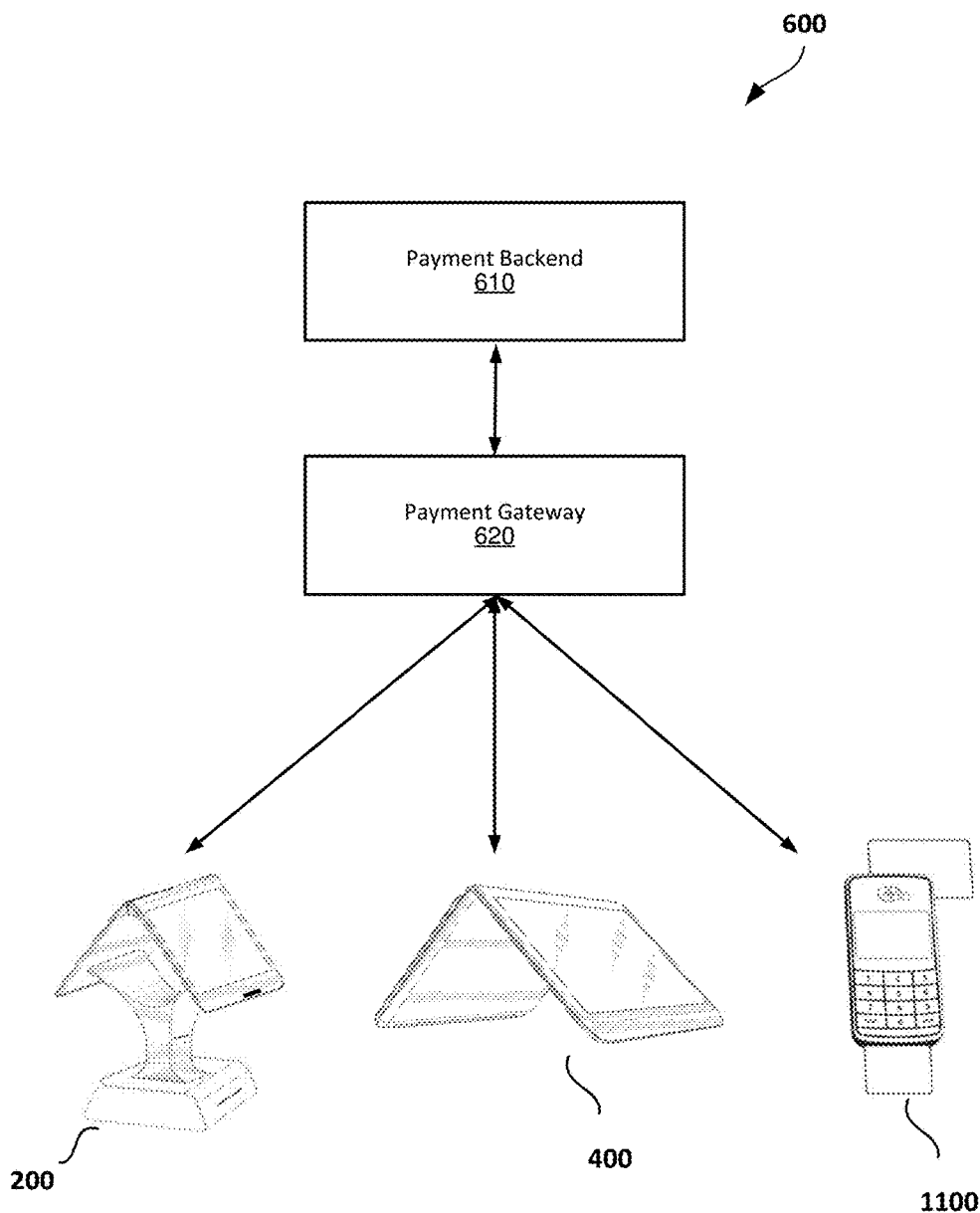
FIG. 6 is schematic high level representation of a Payment System according to aspects of the present technology.

All payment transactions through embodiments of the PoS system disclosed herein must comply with the security standards set by the Payment Card Industry (PCI). FIG. 6 illustrates a schematic high level representation of payment interface 600 comprising payment backend 610 infrastructure and payment gateway 620 that regulate and manage all payment related activities such as merchant accounts, credit card processing, settlements, etc. In some embodiments, in order for countertop PoS device 200, portable PoS device 400, or handheld PoS device 1100 to securely execute a payment transaction, payment gateway 620 service is required. Payment gateway 620 then connects with payment backend 610. In various embodiments, payment backend 620 includes processor, acquirer, and interchange network all the way to settlement to complete the transaction cycle. In particular embodiments, multiple merchant service providers can be integrated with the PoS systems disclosed herein.

Figure 7:
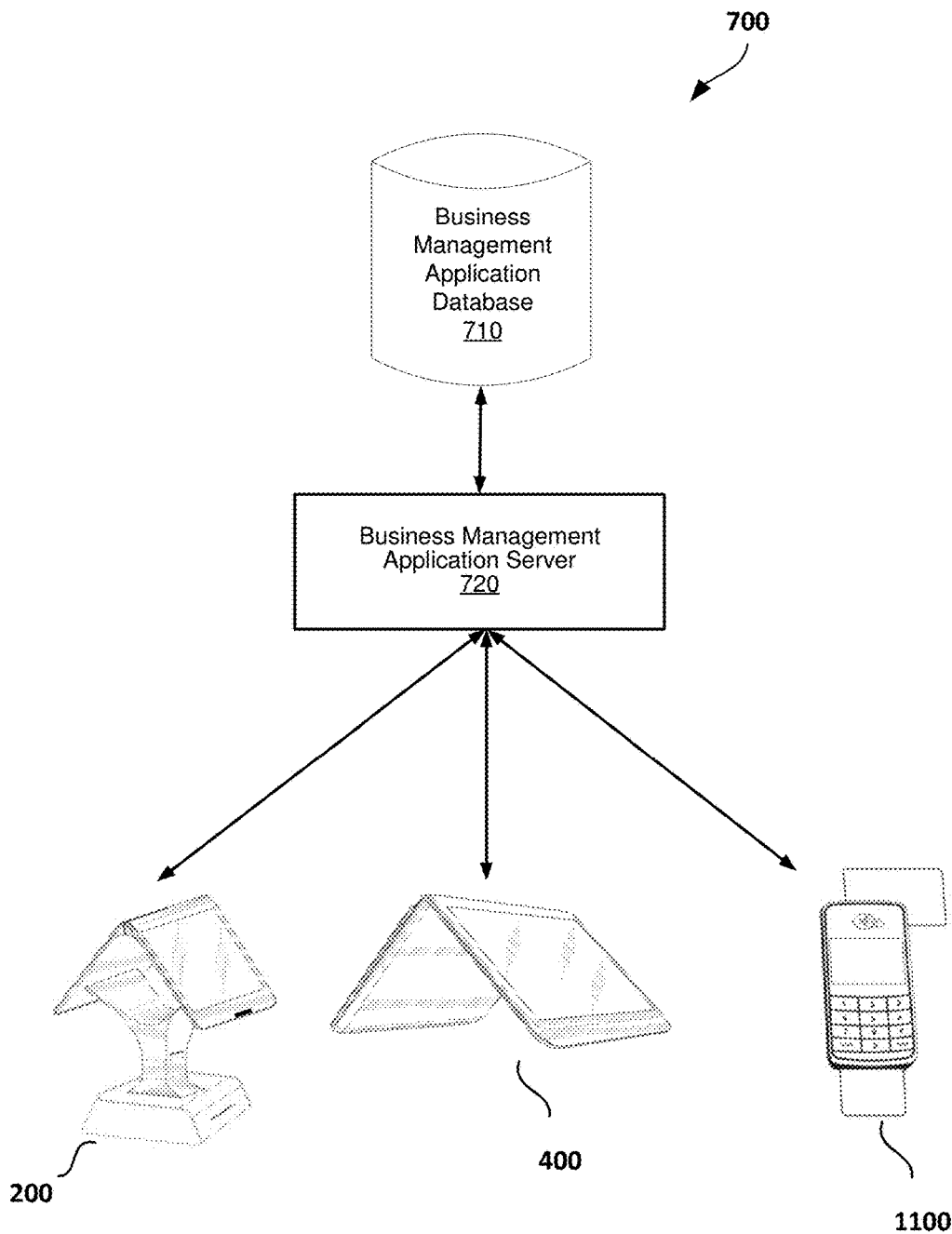
FIG. 7 is schematic high level representation of a Business Management System according to aspects of the present technology.

FIG. 7 illustrates a schematic high level representation of a business management system 700 comprising a business management application database 710 and a business management application server 720. Countertop PoS device 200, portable PoS device 400, or handheld PoS device 1100 may be connected to business management application server 720 using a network (not specifically shown in FIG. 7). The network may be any suitable form, such as a wide area network (WAN) or Internet and/or one or more local area networks (LANs). The network may include any suitable number and type of devices (e.g., routers and switches) for forwarding commands, content, and/or web object requests from each device to the online community application and responses back to the devices. In some embodiments, a private or public cloud provides all management services to an individual store. The business management services may include inventory management, CRM, ERP, targeted advertisement, content updates based on collected statistics, price updates, and surveys, targeted customized services for registered users, dashboards for quick monitoring, reports for executives, statistics relied on to make business decisions, data mining, and the like. According to particular embodiments, management can manually interact with business management system 700 to update and modify information based on business intelligence data mining and analysis.

Figure 8:
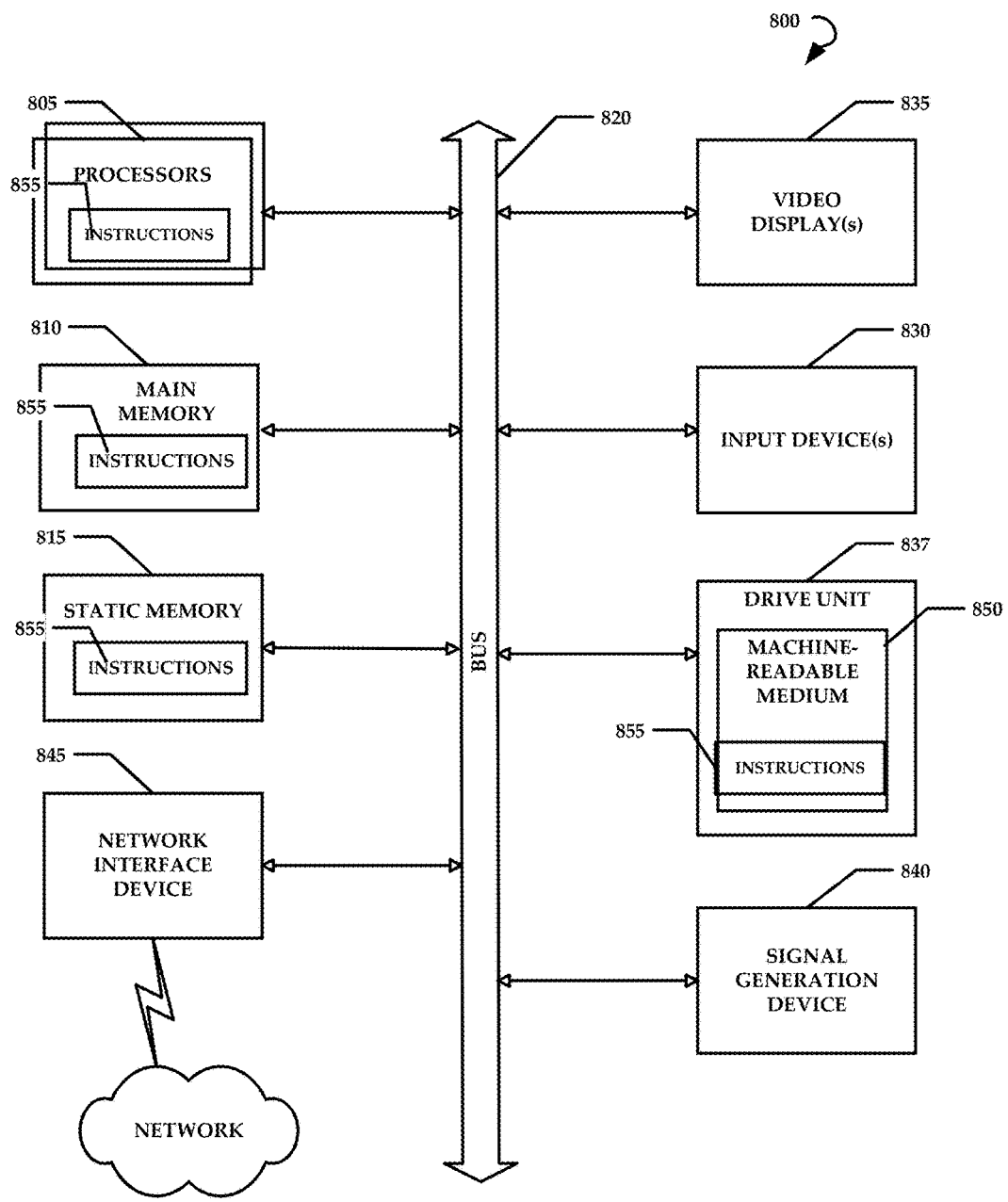
FIG. 8 is a schematic representation of a computer system or a machine, within which a set of instructions for causing the machine to perform any one or more of the methodologies discussed herein, can be executed.

FIG. 8 illustrates another exemplary embodiment of a diagrammatic representation of an example machine in the form of a computer system 800, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor or multiple processors 805 (e.g., a central processing unit (CPU), a graphics processing unit (GPU), or both, a secure payment processor), and a main memory 810 and static memory 815, which communicate with each other via a bus 820. The computer system 800 may further include a video display(s) 835 (e.g., a liquid crystal display (LCD), multiple video displays). The computer system 800 may also include an alpha-numeric input device(s) 830 (e.g., a keyboard, keypad, touchscreen), a cursor control device (e.g., a mouse, a stylus) (not shown), a voice recognition or biometric verification unit (not shown), a MSR (not shown), an EMV card reader (not shown), NFC reader (not shown), a scanner or barcode reader (not shown), a cash drawer (not shown), a weighing pad (not shown), a drive unit 837 (also referred to as disk drive unit), a signal generation device 840 (e.g., a speaker, a printer), and a network interface device 845. The computer system 800 may further include a data encryption module (not shown) to encrypt data.

The disk drive unit 837 includes a computer or machine-readable medium 850 on which is stored one or more sets of instructions and data structures (e.g., instructions 855) embodying or utilizing any one or more of the methodologies or functions described herein. The instructions 855 may also reside, completely or at least partially, within the main memory 810 and/or within the processors 805 during execution thereof by the computer system 800. The main memory 810 and the processors 805 may also constitute machine-readable media.

The instructions 855 may further be transmitted or received over a network via the network interface device 845 utilizing any one of a number of well-known transfer protocols (e.g., Hyper Text Transfer Protocol (HTTP)). While the machine-readable medium 850 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware. For example, various operating systems, such as UNIX, LINUX, CHROME, WINDOWS, MAC OS, PALM OS, ANDROID, IOS, QNX, and other suitable operating systems, may be used.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, cellular data networks such as 2G/3G/4G, etc., or an IEEE 802.11-based radio frequency network.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, Customer Relationship Management (CRM) systems, and the like, which may be utilized in order to implement any of the embodiments of the disclosure as described herein.

The present technology may be implemented as a web-server or in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

The present technology is described above with reference to exemplary embodiments. Therefore, other variations upon the exemplary embodiments are intended to be covered by the present technology.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An integrated point of sale (PoS) device comprising;
   a tablet processor;
   a secure processor;
   a memory for storing executable instructions that comprise a business management system;
   a housing comprising the tablet processor, secure processor, memory, and a plurality of video display screens, wherein at least one merchant display screen is coupled to at least one customer display screen;
   a business management system receiving input from the plurality of video display screens;
   at least one payment reader coupled to at least one of the processors, wherein the at least one payment reader is capable of accepting at least magnetic swipe cards, EMV (Europay, MasterCard, and Visa) chip and pin cards, and NEC (near field communication) payment;
   a barcode scanner coupled to at least one of the processors;
   a cash drawer coupled to at least one of the processors;
   a printer coupled to at least one of the processors;
   an ADA (American Disabilities Act) compliant secure keypad coupled to at least one of the processors; and
   a biometric verification unit coupled to at least one of the processors, and
   wherein a camera is located on the side of the housing containing the at least one customer display screen to securely identifying a customer by face recognition, and wherein the face recognition of the customer applies the customer's loyalty program accounts, accumulated reward points, and coupons.

2. The integrated PoS device of claim 1 wherein the business management system provides third-party store assistance applications, inventory management, customer relationship management, enterprise resource planning, targeted customized services for registered users, targeted advertisement, merchant services, rewards programs, price and content updates, surveys, reports, data mining, and analysis.

3. The integrated PoS device of claim 2 wherein the targeted customized services for registered users comprise personal greetings, storage of loyalty cards, rewards points, coupon redemption, or up sale and cross sale by suggesting items that complement items being purchased.

4. The integrated PoS device of claim 1 wherein a merchant can execute a transaction on the merchant screen while a customer can view transaction activities on the customer screen.

5. The integrated PoS device of claim 1 wherein a camera is located on the side of the housing containing the at least one merchant display screen to allow a merchant to communicate with management and technical staff in real time and wherein at least one camera located on the housing can read barcodes to apply loyalty program accounts, redeem coupons, and scan items.

6. The integrated PoS device of claim 5 wherein the camera located on the side of the housing containing the at least one merchant display screen can securely login merchants by face recognition.

7. The integrated PoS device of claim 1 wherein the barcode scanner is detachable in order to scan heavier items.

8. The integrated PoS device of claim 1 wherein the printer and the cash drawer are integrated into a base that supports the housing.

9. The integrated PoS device of claim 1 wherein the cash drawer has an automated money counting engine that compares the amount of money in the drawer with a calculated transaction amount to identify any discrepancies.

10. The integrated PoS device of claim 1 wherein the cash drawer detects counterfeit money with ultraviolet, infrared, microprint, and magnetic sensors.

11. The integrated PoS device of claim 1 wherein the cash drawer has a theft detection mechanism that triggers an alarm and calls security personnel in the event of theft or unauthorized access.

12. The integrated PoS device of claim 1 further comprising a stylus and an electronic signature screen.

13. The integrated PoS device of claim 12 wherein the stylus includes a tracking sensor that alerts a merchant when the stylus is away from the integrated PoS device.

14. The integrated PoS device of claim 1 wherein the biometric verification unit recognizes fingerprints, retinas, faces, gestures, and voices.

15. The integrated PoS device of claim 1 wherein a bi-optic scanner is integrated into a base that supports the housing.

16. The integrated PoS device of claim 1 wherein the bi-optic scanner integrated into the base that supports the housing also includes a weighing scale.

17. The integrated PoS device of claim 1 wherein a payment module can be detached and attached by sliding the payment module in and out from a payment board placeholder.

18. The integrated PoS device of claim 17 wherein the payment module comprises an electronic signature screen, at least one payment reader, wherein the payment reader is capable of accepting at least magnetic swipe cards, EMV (Europay, MasterCard, and Visa) chip and pin cards, and NFC (near field communication) payment, and the ADA compliant secure keypad.

19. The integrated PoS device of claim 1 wherein the integrated PoS device further comprises a GPS (Global Positioning System).

20. The integrated PoS device of claim 1 wherein the integrated PoS device connects to other devices and networks using various protocols such as Wi-Fi, Bluetooth, or cellular data 2G/3G/4G.

21. A portable point of sale (PoS) device, comprising:
a tablet processor;
a secure processor;
a memory for storing executable instructions that comprise a business management system;
a housing comprising the tablet processor, secure processor, memory, and a plurality of video display screens, wherein at least one merchant display screen is coupled to at least one customer display screen;
a business management system receiving input from the plurality of video display screens;
at least one payment reader coupled to at least one of the processors, wherein the at least one payment reader is capable of accepting at least magnetic swipe cards, EMV (Europay, MasterCard, and Visa) chip and pin cards, and NFC (near field communication) payment;
a barcode scanner coupled to at least one of the processors;
an ADA (American Disabilities Act) compliant secure keypad coupled to at least one of the processors; and
a biometric verification unit coupled to at least one of the processors, and
wherein a camera is located on the side of the housing containing the at least one customer display screen to securely identifying, a customer by face recognition, and wherein the face recognition of the customer applies the customer's loyalty program accounts, accumulated reward points, and coupons.

22. The portable PoS device of claim 21 wherein the business management system provides third-party store assistance applications, inventory management, customer relationship management enterprise resource planning, targeted customized services for registered users, merchant services, rewards programs, price and content updates, surveys, reports, data mining, insights and analytics.

23. The portable PoS device of claim 21 wherein the targeted customized services for registered users comprise personal greetings, storage of loyalty cards, rewards points, coupon redemption, or up sale and cross ale by suggesting items that complement items being purchased.

24. The portable PoS device of claim 21 wherein a merchant can execute a transaction on the merchant screen while a customer can view transaction activities on the customer screen.

25. The portable PoS device of claim 21 wherein a camera is located on the side of the housing containing the at least one merchant display screen to allow a merchant to communicate with management and technical staff in real time and wherein at least one camera located on the housing can read barcodes to apply loyalty program accounts, redeem coupons, and scan items.

26. The portable PoS deme of claim 25 wherein the camera located on the side of the housing containing the at least one merchant display screen can securely login merchants by face recognition.

27. The portable PoS device of claim 21 wherein a camera is located on the side of the housing containing the at least one customer display screen to securely identifying a customer by face recognition.

28. The portable PoS device of claim 27 wherein the face recognition of the customer applies the customer's loyalty program accounts, accumulated reward points, and coupons.

29. The portable PoS device of claim 21 further comprising a stylus and electronic signature screen.

30. The portable PoS device of claim 29 wherein the stylus includes a tracking sensor that alerts a merchant when the stylus is away from the portable PoS device.

31. The portable PoS device of claim 21 where in portable PoS device is further communicatively coupled with a weighing pad.

32. The portable PoS device of claim 21 wherein the biometric verification unit recognizes fingerprints, retinas, faces, gestures, and voices.

33. The portable PoS device of claim 21 wherein a payment module can be detached and attached by sliding the payment module in and out from a payment board placeholder.

34. The portable PoS device of claim 33 wherein the payment module comprises an electronic signature screen, at least one payment reader, wherein the payment reader is capable of accepting at least magnetic swipe cards, EMV (Europay, MasterCard, and Visa) chip and pin cards, and NFC (near field communication) payment, and the ADA compliant secure keypad.

35. The portable PoS device of claim 21 wherein the portable PoS device further comprises a GPS (Global Positioning System).

36. The portable PoS device of claim 21 wherein the portable PoS device connects to other devices and networks using various protocols such as Wi-Fi, Bluetooth, or cellular data 2G/3G/4G.

37. A handheld point of sale (PoS) device comprising:
a tablet processor;
a secure processor;
a memory for storing executable instructions to execute a business management system;
a housing comprising the tablet processor, secure processor, memory,
and at least one video display screen;
a business management system receiving input from the at least one video display screen;
at least one payment reader coupled to at least one of the processors, wherein the at least one payment reader is capable of accepting at least magnetic swipe cards, EMV (Europay, MasterCard, and Visa) chip and pin cards, and NFC (near field communication) payment;
a detachable barcode scanner communicatively coupled to at least one of the processors;
a detachable printer communicatively coupled to at least one of the processors;
an ADA (American Disabilities Act) compliant secure keypad communicatively coupled to at, least one of the processors;
a biometric verification unit communicatively coupled to at least one of the processors,
at least one camera coupled to at least one of the processors;
a stylus coupled to at least one of the processors; and
a GPS (Global Positioning System) coupled to at least one of the processors, and
wherein a camera is located on the side of the housing containing the at least one customer display screen to securely identifying a customer by face recognition, and wherein the face recognition of the customer applies the customer's loyalty program accounts, accumulated reward points, and coupons.

* * * * *